United States Patent [19]

Chung et al.

[11] 4,394,460

[45] Jul. 19, 1983

[54] ETHYLENE-CHLOROTRIFLUOROETHYLENE COPOLYMER FOAM

[75] Inventors: Daniel C. Chung, Middlesex; William A. Miller, Bridgewater; Eugene R. Baumgaertner, Florham Park, all of N.J.

[73] Assignee: Allied Corporation, Morris Township, Morris County, N.J.

[21] Appl. No.: 327,326

[22] Filed: Dec. 4, 1981

Related U.S. Application Data

[62] Division of Ser. No. 213,716, Dec. 8, 1980, Pat. No. 4,331,619.

[51] Int. Cl.³ .............................. C08J 9/08; C08J 9/10
[52] U.S. Cl. .................................... 521/92; 521/79; 521/145; 521/908; 521/909; 521/910
[58] Field of Search .................. 521/92, 79, 145, 908, 521/909, 910

[56] References Cited

U.S. PATENT DOCUMENTS

| | | | |
|---|---|---|---|
| 3,306,862 | 2/1967 | Mageli et al. | 260/2.5 |
| 3,320,189 | 5/1967 | Ham | 260/2.5 |
| 3,347,845 | 10/1967 | Sheppard et al. | 260/192 |
| 3,428,583 | 2/1969 | Lasman | 260/2.5 |
| 3,470,119 | 9/1969 | Benning et al. | 260/2.5 |
| 3,498,934 | 3/1970 | Kraemer et al. | 260/2.5 |
| 3,554,937 | 1/1971 | Cadus et al. | 260/2.5 |
| 3,575,897 | 4/1971 | Port et al. | 260/2.5 |
| 3,725,317 | 4/1973 | Ronden et al. | 260/2.5 |
| 3,775,352 | 11/1973 | Leonard | 260/2.5 |
| 3,894,974 | 7/1975 | Hunter et al. | 260/2.5 |

*Primary Examiner*—Morton Foelak
*Attorney, Agent, or Firm*—Richard A. Negin

[57] ABSTRACT

A foam composition comprising an ethylene-chlorotrifluoroethylene copolymer, a blowing agent and a nucleating agent. The nucleating agent is the carbonate or oxide of a metal cation from the group of metals consisting of magnesium, calcium, barium, zinc and lead. The invention also is a method of making the above foam copolymer composition.

34 Claims, 4 Drawing Figures

ETHYLENE-CHLOROTRIFLUOROETHYLENE COPOLYMER FOAM

This is a division of application Ser. No. 213,716, filed Dec. 8, 1980, now U.S. Pat. No. 4,331,619.

BACKGROUND OF THE INVENTION

This invention is in the field of foamed or blown polymeric materials; more particularly, this invention relates to a foamed copolymer of ethylene and chlorotrifluoroethylene.

It is well known to produce foamed polymeric materials. Foamed polymeric material compositions which are of interest with regard to the present invention are disclosed in U.S. Pat. Nos.: 3,306,862; 3,347,845; 3,428,583; 3,518,332; 3,574,659; 3,725,317; 3,743,605; 3,862,963; 3,957,192; and 4,031,041.

It is known to use materials from the class of dihydrocarbyl hydrazodicarboxylates as blowing agents in polymeric materials (U.S. Pat. No. 3,888,801). This class of blowing agents has been found to thermally decompose to produce olefins, carbon dioxide, carbon monoxide, alcohols and a small amount of nitrogen. It is also known that other additives such as plasticizers, fillers, nucleating agents and the like, can be added to polymeric materials when using the hydrazodicarboxylates.

Japanese Kokai Patent Publication Nos. 25860-1977, 53964-1977, 121864-1978, and 41969-1979 relate to ethylene-ethylenetetrafluoride copolymer foam compositions. Of particular interest is Kakai Patent Publication No. 41969-1979, which discloses an ethyleneethylenetetrafluoride copolymer which contains a nucleating agent which can include magnesium oxide and calcium carbonate; and a blowing agent which can include diisopropyl hydrazodicarboxylate. It is noted that when using nucleating agents including magnesium hydroxide and calcium carbonate, it is difficult to obtain a blown product which contains fine gas bubbles and has good surface smoothness. This publication further notes that the basic carbonates of lead, zinc and magnesium can be used as blowing agents.

The terms blowing agents and nucleating agents used herein are used in accordance with their traditional meaning in the foam plastic arts. Blowing agents are defined as chemicals added to plastics and rubbers that generate inert gases on heating, causing the resin to assume a cellular structure. Blowing agents are also known as foaming agents.

Nucleating agents are materials used to provide sites for the formation of cells resulting from the blowing agents. Nucleating agents are generally used to provide a plurality of locations for cell formation to yield a finer cell structure.

SUMMARY OF THE INVENTION

The present invention is a composition comprising a copolymer of ethylene and chlorotrifluoroethylene. The copolymer has between 40 and 60 mol percent of ethylene units and correspondingly between 60 and 40 mol percent of chlorotrifluoroethylene units. There is an effective amount of blowing agent and a nucleating agent. There can be up to 10 parts, and preferably 0.1 to 5 parts of blowing agent per hundred parts of copolymer. The nucleating agent is the talc or a carbonate or oxide of a metal cation selected from the group of metals consisting of magnesium, calcium, barium, zinc and lead, or a mixture thereof. There can be up to 30 parts, and preferably 0.1 to 5 parts, of nucleating agent per hundred parts of copolymer.

Additionally, the present invention comprises a method of making a foam copolymer of ethylene and chlorotrifluoroethylene. The copolymer has between 40 and 60 mol percent ethylene units and correspondingly between about 60 and about 40 mol percent of chlorotrifluoroethylene units. The copolymer is blended with an effective amount of blowing agent, and a nucleating agent which is talc or the carbonate or oxide of a metal selected from the group consisting of magnesium, calcium, barium, zinc and lead, or a mixture thereof. There can be up to 10 parts, and preferably 0.1 to 5 parts of blowing agent per hundred parts of copolymer and up to 30 parts, preferably 0.1 to 5 parts, of nucleating agent per hundred parts of copolymer. The blend is heated to above the melting temperature of the copolymer under sufficient pressure to prevent foaming, and then the pressure is released.

Preferably, the nucleating agent is calcium carbonate and the blowing agent is from the class of hydrazodicarboxylates, such as diisopropyl hydrazodicarboxylate. Preferably, high density polyethylene can be added to the composition.

Advantages, objects and features of the present invention will become apparent by reference to the following specification.

DETAILED DESCRIPTION OF THE INVENTION

Figure 2:
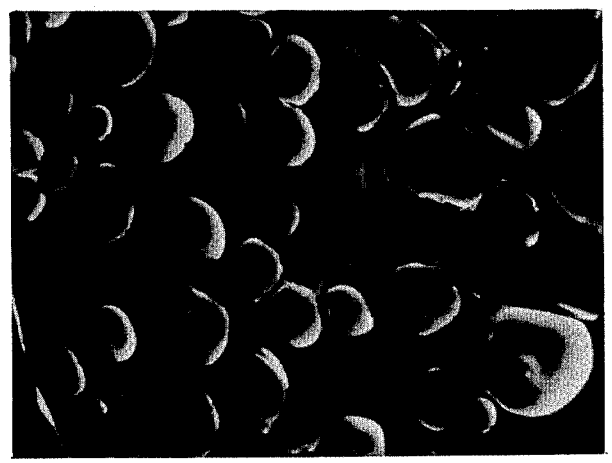
FIG. 2 is a microphotograph of a cross-section of an extrudate of FIG. 1.

The present invention is a composition, and a method for making, a foam copolymer. The composition comprises a copolymer of ethylene and chlorotrifluoroethylene, the copolymer having from 40 to 60 mol percent of ethylene units, and correspondingly from about 60 to 40 mol percent of chlorotrifluoroethylene units. There is a nucleating agent which is the carbonate or oxide of a metal cation selected from the group consisting of magnesium, calcium, barium, zinc and lead. There is also an effective amount of blowing agent. The term "effective amount of blowing agent" is used to indicate a sufficient amount of blowing agent to cause cells to form within the copolymer matrix. There can be up to 10 parts of blowing agent per hundred parts of copolymer. Preferably, there is from 0.1 to 5, and more preferably from 0.5 to 3, parts of blowing agent per hundred parts of polymer.

The copolymers of ethylene and chlorotrifluoroethylene, which may be used in the composition of the present invention, are high molecular weight, normally solid, thermoplastic polymers containing from 40 to 60 mol percent of ethylene units in the molecule, and correspondingly 60 to 40 mol percent chlorotrifluoroethylene units. The melt index is preferably from about 1 to about 50, more preferably from 2 to 30, and most preferably from 10 to 25 g/10 minutes. The melt index is measured in accordance with modified ASTM Test No. 1238, run at 275° C. under a piston load of 2160 grams. The copolymer has a melting point from about 200° C. to about 265° C. The processing temperatures are generally in the range from 240° C. to 320° C., and preferably 260° C. to 300° C.

The copolymers of ethylene and chlorotrifluoroethylene are well known and can be prepared by various known processes. Such processes include those shown in U.S. Pat. No. 2,392,378; British Pat. No. 949,422; U.S. Pat. Nos. 3,371,076 and 3,501,446; and Nucleonics, September, 1964, pp. 72–74. The copolymer of ethylene and ethylene-chlorotrifluoroethylene of the present invention can be made by any of the above disclosed methods or any other method known in the art. The copolymer can also contain nominal amounts of comonomers other than ethylene and chlorotrifluoroethylene, including propylene, isobutylene, vinyl fluoride, propylene, hexafluoride, tetrafluoroethylene, vinylidene fluoride, perfluoro-vinyl ether, acrylic acid and alkyl ester, methacrylic acid and alkyl ester, perfluoro alkyl ethylene, etc.

Preferably the blowing agent used is a type defined above which decomposes yielding gases which form cells in the polymer matrix. More preferably, the blowing agents are from the group consisting of the class of hydrazodicarboxylate carbazides, and diesters of azodiformic acid. The blowing agents used should begin to decompose non-explosively and controllably at temperatures no greater than the processing temperatures of the ethylene-chlorotrifluoroethylene copolymer being processed. The blowing agent should not leave residues which degrade the copolymer and have a deleterious effect on the properties or the appearance of the copolymer. A preferred blowing agent is a compound having the formula: ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms. The most preferred blowing agent is diisopropyl hydrazodicarboxylate. There should be sufficient diisopropyl hydrazodicarboxylate to effectively form cells upon the release of pressure on the molten copolymer blends. Preferably there is from 0.1 to about 5 parts of diisopropyl hydrazodicarboxylate per hundred parts of the copolymer. There can be more than 5 parts, but it has been found that an excess of blowing agent results in a rougher skin on the foamed article but is otherwise not damaging to the copolymer. More than 5 parts generally does not provide any additional advantage. A preferred carbazide blowing agent is p-toluene sulfonyl semicarbazide. Diesters of azodiformic acid which can be used include those disclosed in U.S. Pat. No. 3,306,862.

The composition of the present invention also contains at least one nucleating agent. The nucleating agent provides sites for the formation of cells generated by the blowing agent. The use of nucleating agents results in a greater number of finer cells than would form without a nucleating agent. For the purposes of the present invention, there is considered to be two types of nucleating agents. Inert nucleating agents are nucleating agents which are not chemically affected during the formation of the foam. Active nucleating agents are nucleating agents which undergo a chemical change, enchancing their effect. There can be up to 30 parts of nucleating agent, preferably from 0.1 to 5 parts of nucleating agent per hundred parts of copolymer.

Inert nucleating agents which can be useful include magnesium oxide, calcium oxide, zinc oxide, lead oxide, barium oxide, and talc. These inert nucleating agents were found to be effective in forming a plurality of fine cells in ethylene-chlorotrifluoroethylene copolymer when used in combination with blowing agents such as diisopropyl hydrazodicarboxylate. Other inert nucleating agents, such as carbon black, were found not to be as effective.

Active nucleating agents, particularly metal carbonates such as magnesium, calcium, barium, zinc and lead carbonates, have been found to be the most effective nucleating agents when used in combination with blowing agents, such as diisopropyl hydrazodicarboxylate. The most preferred nucleating agent is calcium carbonate. The particle size of the calcium carbonate can be up to about 10 microns, and is preferably from 0.01 to 0.3 microns. The calcium carbonate which is most preferred is a precipitated grade having an average diameter of about 0.03 microns. However, larger size particles have been successfully used, including particles having an average diameter size between 0.7 microns and 3.0 microns. Preferably up to 5 parts by weight of calcium carbonate per 100 parts by weight copolymer can be used. More preferably, there are about 0.5 to about 3 parts by weight of calcium carbonate per 100 parts by weight of copolymer.

It has been found that the copolymer can be filled up to 30 parts by weight filler per 100 parts by weight of copolymer and still obtain a satisfactory foam. Therefore, up to 30 parts by weight of nucleating agent can be used. The nucleating agent that does not act as a nucleating agent acts as a filler.

In other embodiments of the present invention, combinations of active and inert nucleating agents can be used together. For example, in a given formulation, 0.5 parts by weight of talc has been used in conjunction with 1 part by weight of calcium carbonate plus 1.5 parts by weight of diisopropyl hydrazodicarboxylate per 100 parts of copolymer to obtain a satisfactorily foamed copolymer of ethylene and chlorotrifluoroethylene.

In addition to the above inert nucleating agents, other inert foam nucleating agents which can be used in addition to the nucleating agents of the present invention include boron nitrite, alumina, titanium oxide, silica, calcium silicate, graphite, zinc sulfide, molybdenum disulfide, magnesium hydroxide, wollastonite, kaolin, and others.

The active nucleating agents have been found to be unexpectedly effective as nucleating agents. In the past, metal carbonates have been used as blowing agents. Metal carbonates such as magnesium carbonate, zinc carbonate, and lead carbonate have been used as blowing agents in copolymers such as ethylene-tetrafluoroethylene copolymers. This is possible because at the processing temperatures of ethylene-tetrafluoroethylene copolymers, these metal carbonates decompose yielding carbon dioxide. However, calcium carbonate has been found to be thermally stable up to about 800°

C. Therefore, calcium carbonate is treated as an inert material and has, in fact, been used an inert nucleator in ethylene-tetrafluoroethylene copolymer foam compositions. Surprisingly, in copolymers of ethylene and chlorotrifluoroethylene, it has been found that the calcium carbonate at least partially decomposes. It is believed this happens because trace amounts of hydrogen chloride may be generated at the processing conditions of the ethylene-chlorotrifluoroethylene copolymer. The hydrogen chloride reacts with the calcium carbonate forming carbon dioxide. It is believed that the formation of this carbon dioxide provides sites for initiation or nucleation of cells forming from the blowing agent.

Metal carbonates which are thermally unstable at the processing temperature can be used with ethylene-chlorotrifluoroethylene copolymers. There is thermal decomposition to form carbon dioxide as well as the possible action of the hydrogen chloride to form the carbon dioxide. The calcium carbonate with its thermal stability provides a unique advantage over the other metal carbonates during processing, as will be discussed in more detail below. Briefly, this enables the thermally stable calcium carbonate to be melt-blended with the ethylene-chlorotrifluoroethylene copolymer prior to addition of the blowing agent. This allows a thorough melt-blended distribution of an active nucleating agent which is not possible when using thermally unstable, active nucleating agents, such as magnesium and zinc carbonates.

In addition to the above materials, it has been found that various additives can be included in the foams, such as colorants, antioxidants, flame retardants, etc. Up to 3 parts, and preferably 0.5 to 3 parts of high density polyethylene per hundred parts of copolymer, having a melt index between about 10 and 100, and preferably between 40 and 50, can be added. This material results in a foam having a smoother surface, particularly an extruded foam. Other materials, such as polypropylene, can also be used to enchance the smoothness of the foam surface.

A foam copolymer of ethylene and chlorotrifluoroethylene, where the copolymer has between 40 and 60 mol percent of the ethylene units and correspondingly between about 60 and 40 mol percent of chlorotrifluoroethylene units, can be made by blending the copolymer with an effective amount of blowing agent and a nucleating agent, which is the carbonate or oxide of a metal selected from the group consisting of magnesium, calcium, barium, zinc and lead. An effective amount of blowing agent is an amount sufficient to cause the formation of cells in the polymer matrix. Cell formation generally takes place in the matrix at temperatures above the matrix melting point. After blending of the copolymer with the blowing agent and nucleating agent, the material is heated to above the melt temperature of the copolymer under sufficient pressure to prevent foaming. Upon release of the pressure, the foaming occurs.

The temperatures to which the blend should be heated are preferably above 240° C. and are in any case above the melt temperature of the copolymer blend. The preferred processing temperature range is from about 240° C. to about 320° C., and more preferably from about 260° C. to about 300° C.

It is desirable to have the gases formed during processing to remain dissolved in the copolymer matrix while the polymer is within a blending apparatus, i.e. an extruder. The pressures in an extruder are generally sufficient to maintain the gas dissolved in the copolymer matrix. It has been found that processing pressure of at least 1,000 pounds per square inch in the die region of the extruder are sufficient to maintain the gases dissolved. As the pressure is decreased larger bubbles begin to appear.

The copolymer, blowing agent and nucleating agent can be physically blended by mixing powdered copolymer with powdered nucleating agent and powdered blowing agent in a suitable tumbler, as known in the art. The blended powders can then be heated under pressure to form a foam.

Alternatively, the blend can be formed by melt blending the ethylene-chlorotrifluoroethylene copolymer and the nucleator, where the nucleator is thermally stable at the melt blend temperature. The melt blend temperature should be at least the melting point of the copolymer and is preferably above 240° C. This would include inert nucleators and only calcium carbonate as an active nucleator. The melt blended mixture is preferably prepared in an extruder and is preferably pelletized. The pellets are then mixed with blowing agent. Preferably, the pellets can be wetted with an inert, thermally stable liquid which is compatible with the copolymer. A preferred liquid is chlorotrifluoroethylene oil at a low molecular weight, preferably between 500 and 5,000. A minimum amount of the wetting material is desirable. Good wetting has been obtained with about 0.2 parts by weight of chlorotrifluoroethylene oil per 100 parts of copolymer. The wetted pellets of blended copolymer and nucleator are dusted with a powdered blowing agent. It has been found that between 1 and about 1.5 parts by weight of a powdered blowing agent, such as diisopropyl hydrazodicarboxylate, can be used to uniformly coat the pellets. Use of any more than this will generally result in a waste of blowing agent. The excess blowing agent is not uniformly distributed. The advantage of the latter method of melt blending the copolymer and nucleating agent and dusting on the blowing agent is that the final blended material can be in pellet form and easily fed into an extruder or other piece of equipment which can be used to form the foam.

Other additives can be added to the blended mixture. Up to 3 parts and preferably 0.5 to 3 parts, of high density polyethylene which is stable per hundred parts of copolymer can be either blended in powder form with the above-discussed powder blend or melt-blended with the copolymer and nucleator where a pellet form of the composition is made.

Figure 1:
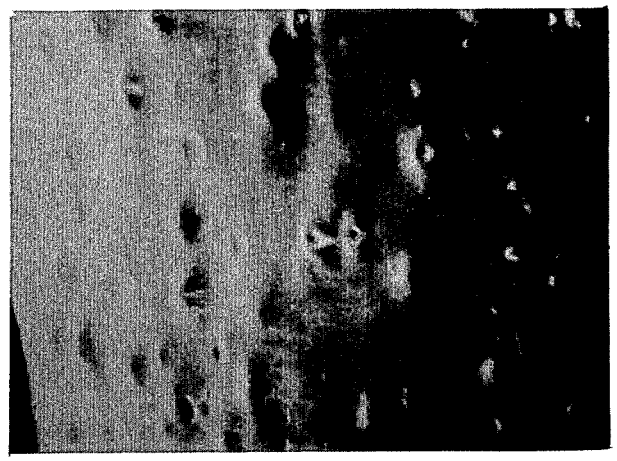
FIG. 1 is a microphotograph of the surface of an extruded ethylene-chlorotrifluoroethylene foam wherein the nucleating agent is calcium carbonate. (See Example 3.)

The blended copolymer mixture can be fed into an extruder and heated under pressure to above the copolymer melt temperature. The processing temperature in the extruder is preferably from about 240° C. to 340° C., more preferably 260° C. to 300° C. The composition of the present invention can be fed from the extruder through a die. Upon passing from the die into a lower pressure environment, generally into the atmosphere, the composition of the present invention results in a foam having uniform and small cells as shown in FIG. 2, which is discussed in more detail in Example 3. Additionally, the surface is smooth and virtually free of holes, as shown in FIG. 1, which is discussed in detail in Example 3. Alternately, the blend can be fed into the barrel of an extruder and passed through the gate of an injection mold and into the lower pressure mold cavity where foaming can take place. Here again, the composition of the present invention results in small uniform cells distributed uniformly through the injection molded article. Here too, the surface formed is smooth and relatively free of defects. It has been found that the foam produced from the composition of the present invention is flexible and can be extruded or formed to suitable shapes. In fact, it can be extruded to form any desired profile, including tubes, rods and castings. Injection molding can occur to any desired shape.

Several examples are set forth below to illustrate the nature of the invention and the manner in carrying it out. However, the invention should not be considered as being limited to the details thereof.

EXAMPLE 1

To 100 parts by weight of ethylene-chlorotrifluoroethylene (ECTFE) copolymer, 1 part by weight of magnesium carbonate and 1 part by weight of diisopropyl hydrazodicarboxylate were added. The ECTFE was Allied Chemical Halar ® ECTFE, having a density of 1.68 gm/ml, a melt index of 15 g/10 minutes as measured according to ASTM 1238 run at 275° C., under a piston load of 2160 grams, and about 49 to 51 mol percent ethylene and a corresponding amount of chlorotrifluoroethylene monomer. The magnesium carbonate used was Magnesium Carbonate, Basic Powder, Reagent grade, from Matheson, Coleman and Bell of Norwood, Ohio. The diisopropyl hydrazodicarboxylate used was Uniroyal HT 500. The mixture was dispersed uniformly by use of a ribbon blender. The mixture was extruded through a 1½ inch extruder which is equipped with a barrel having an L/D of 20 and a crosshead wire coating die. The die opening was 82 mil. The temperature in the extruder was in the range of 450° F. to 530° F. The foam was extruded on a 22 gauge copper wire. The diameter of the foam coated wire was about 100 mil. The foam coated wire had a minimum of pin-hole appearance on the surface. The foam density was 0.92 g/ml and the average cell size was less than 100 microns.

EXAMPLE 2

To 100 parts by weight of ECTFE (same type as Ex. 1), 1 part by weight of fine talcum powder, and 1 part by weight of high density polyethylene were added. The talcum powder had an average particle size of about 4 microns. The high density polyethylene had a melt index (ASTM 1238) of 40. The mixture was melt blended in an extruder in the temperature range of 470° F. to 540° F. and pelletized. The pellets were dried in a hot air oven at about 80° C.

Into 100 parts by weight of the blended pellets, 0.2 parts by weight of chlorotrifluoroethylene oil was added, and tumbled in a ribbon blender. The chlorotrifluoroethylene oil was Halocarbon oil, from the Halocarbon Corp., having a Brookfield viscosity of 56 cps @100° C.

After the chlorotrifluoroethylene oil was evenly distributed on the pellet surface, 1.5 parts per 100 parts of ECTFE copolymer of diisopropyl hydrazodicarboxylate (same type as Ex. 1) powder was added and the mixing continued until the powder dispersed and adhered to the pellet surface.

The coated pellets were extruded through a 1½ inch extruder which was equipped with a crosshead wire coating die. The die opening was 170 mil. The extruder zone temperatures were from 445° F. to 570° F. The foam was extruded on 18 gauge, 19 strand copper 20 wire. The diameter of the foam coated wire was about 250 mil. The foam coated wire had a good skin surface and a minimum of pin-hole appearance at the surface. The foam density was 0.84 g/ml, and the average cell size was about 500 microns.

EXAMPLE 3

Example 2 was repeated with the 1 part of talcum powder replaced by 1 part of calcium carbonate powder. The calcium carbonate used was Pfizer Corp., Multiflex MM calcium carbonate having an average particle size of 0.03 microns. The coated pellets were extruded in a similar manner as in Example 2. The foam coated wire had a diameter of about 250 mil. The foam coated wire had an excellent surface appearance with a minimum amount of pin-holes. The foam density was 0.75 g/ml, and the average cell size was about 200 microns. FIGS. 1 and 2 are microphotographs of the extrudate of Example 3, magnified 45 times. FIG. 1 shows an excellent, smooth surface with very few pin-holes. Pin-holes are bubbles which are open to the surface, resulting in a surface hole. FIG. 2 shows a relatively uniform distribution of cells as you move away from the surface. Further, the size of the cells is relatively uniform. This is particularly apparent by comparison with FIG. 4 of Comparative 3, which contains no nucleating agent.

EXAMPLE 4

The pellets produced in Example 3 were extruded on 22 gauge copper wire according to the extrusion process of Example 1. The foam coated wire had excellent surface appearance and was virtually pin-hole free. The foam density was 0.68 g/ml, and the average cell size was less than 100 microns. This example shows that the density and cell size for foams of the same composition, extruded at the same temperature, can vary with equipment used, as well as the size of the extrudate. Excellent results were obtained in both Examples 3 and 4, using the composition of Example 3.

EXAMPLE 5–7

Compositions were made with 2 parts by weight per 100 parts by weight of ECTFE (same type as Ex. 1) of each nucleating agent listed in Table 1. In each Example and Comparative, the nucleating agent and ECTFE were tumble mixed, and then extruded through a 1 inch extruder in the temperature range of 480° F. to 570° F. The extrudate was pelletized and dried in a hot air oven at 80° C.

Into 100 parts by weight of the blended pellets, 0.2 parts by weight of the same type of chlorotrifluoroethylene oil as used in Example 2 was added, and tumbled.

After the chlorotrifluoroethylene oil was evenly distributed on the pellet surface, 1 part by weight per 100 parts of ECTFE of p-toluene sulfonyl semicarbazide powder was added and the mixing continued until the powder dispersed and adhered to the pellet surface. The p-toluene sulfonyl semicarbazide was Uniroyal Celogen RA.

The coated pellets were extruded through a 1 inch extruder having an L/D of 15, and heated in the range of from about 470° F. to about 570° F. Specifically, Zone 1 was about 480° F., Zone 2 was about 570° F., and the die was about 470° F. The die opening was 1/16 inch and the foamed strands were about ⅛ inch in diameter.

The nucleator characteristics and results are summarized in Table I below:

TABLE I

| Ex. | Nucl. Agent | Density | Cell Dia (Microns) | Surface |
|---|---|---|---|---|
| 5 | Talcum | 0.68 | 100 | Smooth |
| 6 | CaO | 0.72 | 125 | Smooth |
| 7 | MgO | 0.95 | 125 | Smooth |
| Comp 1 | TiO$_2$ | 0.7 | 300 | Slightly Rough |
| Comp 2 | Carbon Black | 1.0 | 200 | Slightly Rough |
| Comp 3 | No Nucl. Agent | 0.67 | 400 | Rough |

Figure 3:
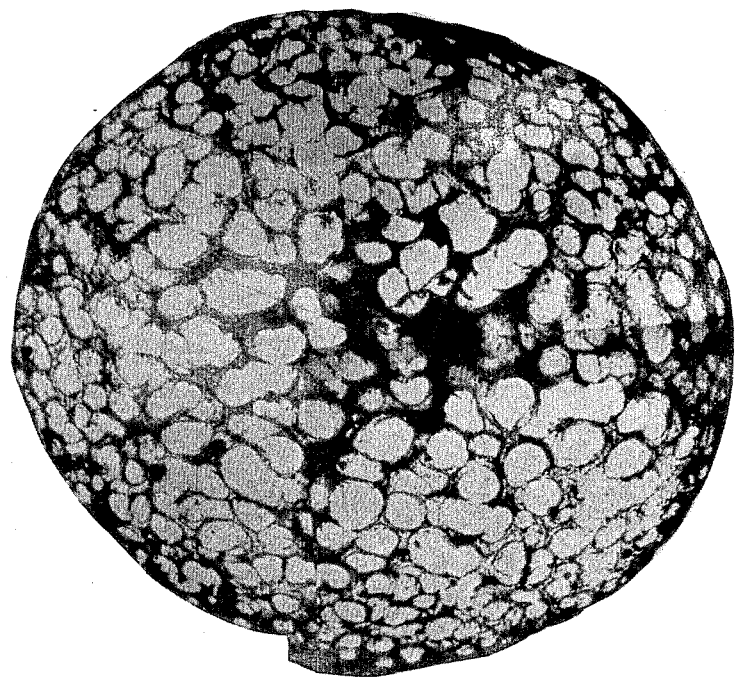
FIG. 3 is a microphotograph of a cross-section of an extruded ethylene-chlorotrifluoroethylene foam wherein the nucleating agent is calcium oxide. (See Example 6.)

FIG. 3 is a microphotograph of the extrudate of the formulation of Example 6 magnified 58 times. The use of the inert calcium oxide results in a smooth surfaced foamed extrudate with relatively uniform cell distribution and size. The is particularly apparent by comparison with FIG. 4 of Comparative 3, which contains no nucleating agent. FIG. 3 is typical of the appearance expected in Examples 5 and 7.

Figure 4:
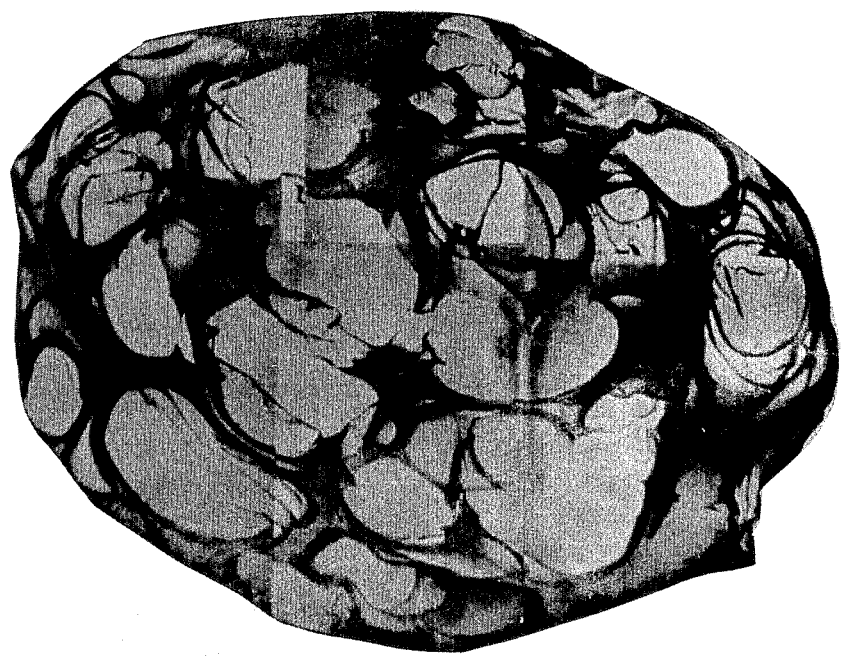
FIG. 4 is a microphotograph of a cross-section of an extruded ethylene-chlorotrifluoroethylene foam containing no nucleating agent. (See Comparative 3.)

FIG. 4 is a microphotograph of the extrudate of the formulation of Comparative 3. No nucleating agent was used. The surface was rough and the cells were larger than when a nucleating agent was used and under the same processing conditions.

While exemplary embodiments of this invention have been described, the true scope of the invention is to be determined from the following claims:

What is claimed is:

1. A composition comprising:
   a copolymer of ethylene and chlorotrifluoroethylene, the copolymer having between 40 and 60 mol percent of ethylene units and correspondingly between about 60 and about 40 mol percent of chlorotrifluoroethylene units;
   an effective amount of a blowing agent selected from the group consisting of hydrozodicarboxylates, diesters of azodiformic acid and carbazides; and
   at least one nucleating agent selected from the group consisting of talc, magnesium carbonate, calcium carbonate, barium carbonate, zinc carbonate, lead carbonate, magnesium oxide, calcium oxide, barium oxide, zinc oxide and lead oxide.

2. The composition as recited in claim 1 wherein the nucleating agent is a carbonate.

3. The composition as recited in claim 2 wherein the nucleating agent is calcium carbonate.

4. The composition as recited in claim 3 wherein there is up to 5 parts of calcium carbonate per hundred parts by weight of copolymer.

5. The composition as recited in claim 4 wherein there is 0.5 to 3 parts of calcium carbonate per hundred parts by weight of copolymer.

6. The composition as recited in claims 1 or 4 further comprising up to 5 parts of an inert nucleating agent.

7. The composition as recited in claim 6 wherein the inert nucleating agent is talc.

8. The composition as recited in claim 8 wherein the carbazide is p-toluene sulfonyl semicarbazide.

9. The composition as recited in claim 8 wherein the blowing agent is a compound having the formula ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms.

10. The composition as recited in claim 9 wherein the blowing agent is diisopropyl hydrazodicarboxylate.

11. The composition as recited in claim 10 wherein there is up to 5 parts by weight of diisopropyl hydrazodicarboxylate per hundred parts of copolymer.

12. The composition as recited in claim 11 wherein there is between about 0.5 and 3 parts of diisopropyl hydrazodicarboxylate per hundred parts of copolymer.

13. The composition as recited in claim 1 further comprising up to about 3 parts by weight of high density polyethylene per hundred parts of copolymer.

14. The composition as recited in claim 1 wherein there is up to 30 parts of the nucleating agent per hundred parts of copolymer.

15. The composition as recited in claim 14 wherein there is from 0.1 to 5 parts of the nucleating agent per hundred parts of the copolymer.

16. The composition as recited in claim 15 wherein there is from 0.5 to 3 parts of the nucleating agent per hundred parts copolymer.

17. The composition as recited in claim 1 wherein there is up to 10 parts of blowing agent per hundred parts of copolymer.

18. The composition as recited in claim 17 wherein there is from 0.1 to 5 parts of blowing agent per hundred parts of copolymer.

19. The composition as recited in claim 18 wherein there is from 0.5 to 3 parts of blowing agent per hundred parts of copolymer.

20. A composition comprising:
   a copolymer of ethylene and chlorotrifluoroethylene, the copolymer having between 40 and 60 mol percent of ethylene units and correspondingly between about 60 and about 40 mol percent of chlorotrifluoroethylene units;
   an effective amount of a chemically decomposing blowing agent; and
   calcium carbonate.

21. The composition as recited in claim 20 wherein the calcium carbonate has a particle size up to 10 microns.

22. The composition as recited in claim 20 wherein the particle size of the calcium carbonate is from 0.01 to 3 microns.

23. The composition as recited in claim 22 wherein there is up to 5 parts by weight calcium carbonate per 100 parts by weight of copolymer.

24. The composition as recited in claims 20 or 23 further comprising up to 5 parts of an inert nucleating agent.

25. The composition as recited in claim 24 wherein the inert nucleating agent is talc.

26. The composition as recited in claim 20 wherein there is between about 0.5 and about 3 parts of calcium carbonate per hundred parts by weight of copolymer.

27. The composition as recited in claim 20 wherein the blowing agent is selected from the group consisting of the class of hydrazodicarboxylates, diesters of azodiformic acid and carbazides.

28. The composition as recited in claim 20 wherein the blowing agent is a compound having the formula ROOC—HN—NH—COOR' wherein at least one of R and R' is selected from the group consisting of secondary and tertiary alkyl groups having from 3 to 5 carbon atoms and the other of R and R' is selected from the group consisting of straight-chain and branched-chain alkyl groups having from 1 to 8 carbon atoms, cycloalkyl radicals having from 5 to 8 carbon atoms, aryl radicals having from 6 to 10 carbon atoms, and alkaryl and aralkyl radicals having from 7 to 10 carbon atoms.

29. The composition as recited in claim 28 wherein the blowing agent is diisopropyl hydrazodicarboxylate.

30. The composition as recited in claim 29 wherein there is from 0.1 to 5 parts by weight of diisopropyl hydrazodicarboxylate per hundred parts of copolymer.

31. The composition as recited in claim 30 wherein there is between about 0.5 and 3 parts of diisopropyl hydrazodicarboxylate per hundred parts of copolymer.

32. The composition as recited in claim 20 further comprising up to about 3 parts by weight of high density polyethylene per hundred parts of copolymer.

33. The composition as recited in claim 20 wherein the blowing agent is a metal carbonate selected from the group consisting of magnesium carbonate, zinc carbonate and lead carbonate.

34. The composition as recited in claim 33 wherein the blowing agent is magnesium carbonate.

* * * * *